United States Patent Office 3,517,789
Patented June 30, 1970

3,517,789
TORQUE CONVERTER AND CLUTCH
Joachim Gimmler and Winfried Glock, Schweinfurt, Germany, assignors to Fichtel & Sachs Aktiengesellschaft, Schweinfurt, Germany
Filed Mar. 5, 1968, Ser. No. 710,686
Claims priority, application Germany, Mar. 7, 1967, F 51,743
Int. Cl. F16d 67/00
U.S. Cl. 192—3.21                                          8 Claims

ABSTRACT OF THE DISCLOSURE

A hydraulic torque converter and a coaxial clutch closely coupled in a common outer casing have a small axial length because the front bearing for the output shaft of the converter is radially aligned with the doughnut-shaped assembly formed by vanes on the impeller, stator and turbine. The front bearing is mounted on a bracket extending axially from the partition wall between the torque converter and the clutch into the central recess in the deeply dished impeller. The vane assembly is of oval shape in radial section, the minor axis of the oval being parallel to the converter axis.

BACKGROUND OF THE INVENTION

This invention relates to power trains for automotive vehicles, and particularly to a hydraulic torque converter suitable for installation in a limited space.

Almost all small European motorcars were originally designed for use with manual transmissions for better fuel economy and lower initial cost. These economical factors have become less important in recent years, and automatic features are being incorporated in the power trains of such cars. This invention more particularly relates to a hydraulic torque converter mounted in a common casing of small axial length with a friction clutch so as to permit installation of the casing between the engine crankshaft and a variable-ratio gear transmission of a motorcar originally designed for a manually controlled power train without requiring major changes in other car elements.

The torque converter arrangement with the improvement of which this invention is most closely concerned has been disclosed in Pat. No. 2,235,418. The known apparatus has an outer casing which is divided by a partition wall into two compartments respectively enclosing the torque converter and a friction clutch and is mounted between the engine and the transmission. The torque converter has an input shaft coupled to the engine, and an output shaft which passes through the partition wall and constitutes the input shaft of the clutch. The last-mentioned shaft is journaled in a bearing mounted on the partition wall. The driving disc of the clutch is mounted on the shaft, and its torque is transmitted by friction to the clutch output shaft, which may be the input shaft of the transmission.

The known arrangement has a relatively great axial length. When combined with the associated transmission, it cannot be fitted into the space previously occupied with a clutch and manual transmission of comparable power-handling capacity. The object of the invention is the provision of a power train of the general type described which is of reduced axial length without losing efficiency.

SUMMARY OF THE INVENTION

In one of its more specific aspects, the invention provides the torque converter with a bearing bracket assembly fixedly fastened on the partition wall which separates the torque converter and clutch compartments in the common outer casing of the apparatus. The bracket assembly extends from the partition wall so far in a direction toward the torque converter that an end portion of the bracket assembly is coextensive with a portion of the vane arrangement formed by the vanes on the impeller, stator, and turbine of the converter. The output shaft of the torque converter is journaled in a bearing mounted on the end portion of the bracket assembly, thereby saving the space conventionally occupied by a front bearing for the converter output shaft which is rearwardly offset from the vane assembly.

The axial dimensions of the torque converter are further reduced by making the vane assembly of oval shape in radial section, the minor axis of the oval being substantially parallel to the common axis of rotation of the torque converter and clutch. The radial dimensions of the torque converter are less critical than the axial length, and the efficiency of the torque converter is not affected by the deviation from the conventional circular cross section of the vane arrangement.

Other features which contribute to the small axial length of the power train of the invention will readily be appreciated from the following detailed description of a preferred embodiment when considered in connection with the attached drawing.

DESCRIPTION OF THE PREFERRED EMBODIMENT

Figure 1:
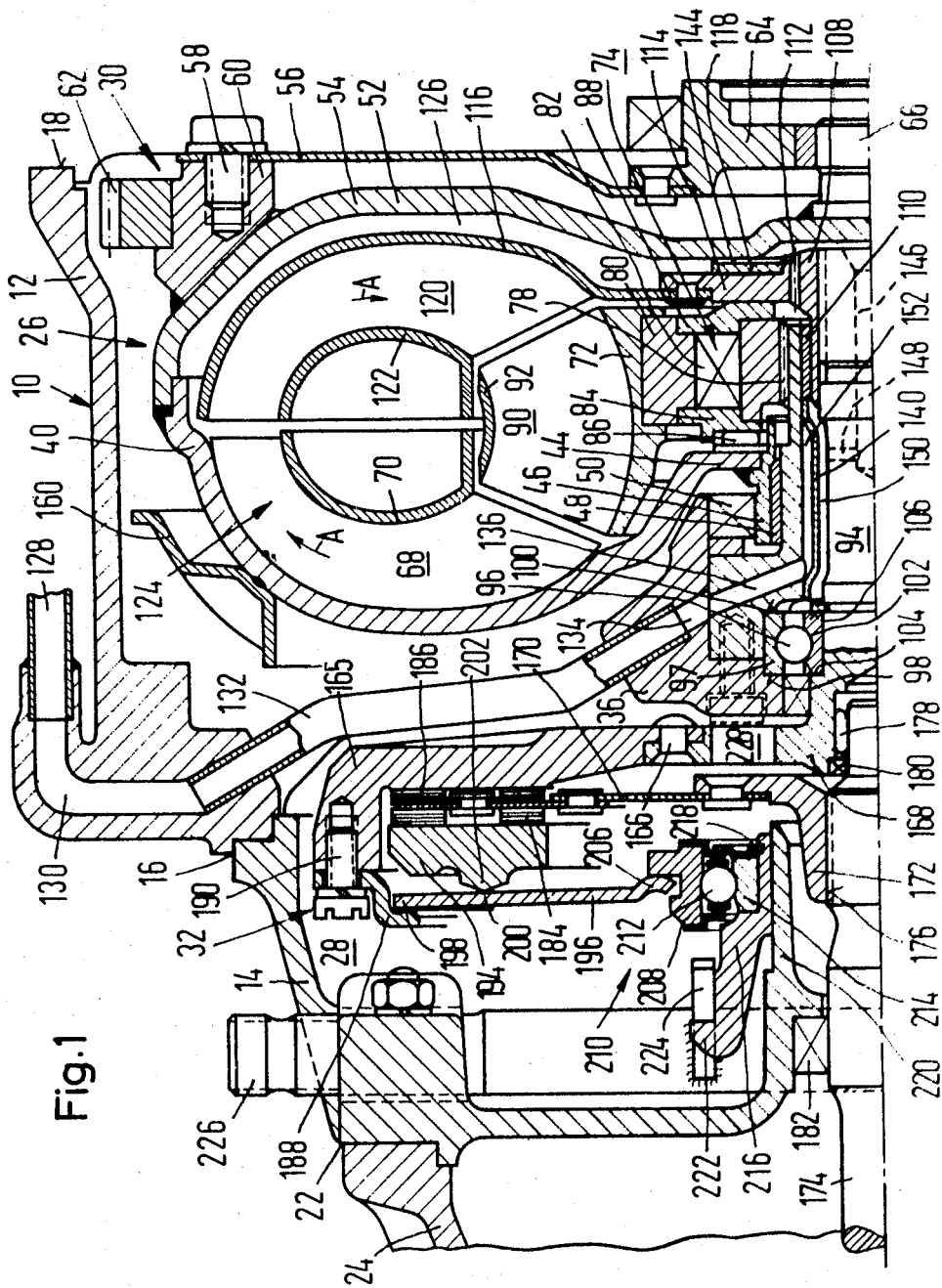
FIG. 1 shows as much of a power train for a motorcar as is needed for an understanding of this invention, the illustration being limited to a hydraulic torque converter and an associated clutch which are shown in side elevational section on their common axis of rotation, the upper half of the apparatus being seen in FIG. 1.

A stationary outer casing 10 has a front portion 12 and a rear portion 14 which are releasably connected along a seam 16 in a known manner, not shown. A radial mounting face 18 of the front portion normally engages an associated internal combustion engine, not itself shown, whereas a similar abutment face 22 on the rear portion 14 is joined to the housing 24 of a gear transmission, not otherwise shown.

A converter compartment 26 and a clutch compartment 28 in the casing portions 12, 14 respectively hold a torque converter 30 and a friction clutch 32, and are separated by a partition wall 34 which is integral with the front portion 12 of the casing 10 and not seen in FIG. 1. A bearing bracket 36 integral with the partition wall 34 axially extends into the torque converter compartment 26. A bearing sleeve 38 is set into a recess of the bracket 36.

The impeller 40 of the torque converter is closely adjacent the partition wall 34 and has a deeply dished central portion 44 which is welded to a tubular hub portion 46 rotatably mounted on the sleeve 38 by means of a bearing bushing 48. A packing 50 radially interposed between respective circumferential faces of the hub portion 46 and the bracket 36 provides a liquid-tight seal.

The impeller 40 is welded to the converter housing 52 which carries a substantially radial sheet metal plate 56, the plate being fastened by bolts 58 to a ring 60 welded to the outer circumferential portion of the housing 52 and equipped with a gear rim 62 normally engaged by the starter motor of the non-illustrated engine. The plate 56 is riveted to a coupling sleeve 64 which is the input member of the torque converter and is normally attached to the crankshaft of the engine. The coupling sleeve 64 is centered on a stub shaft 66 welded to the converter housing 52. The impeller 40 is provided internally with vanes 68 which carry a segment 70 of an approximately toroidal core.

The stator 72 of the torque converted 30 is mounted on the sleeve 38 by means of a one-way brake 74 whose inner ring is circumferentially secured on the sleeve 38 by splines 78 and separated from the outer ring 80 by clamping or wedging rollers 82 in a conventional manner. An annular sealing plate 84 of the brake 74 faces rearwardly and is separated from an opposite radial face of the central portion 44 of the impeller 40 by a contiguously interposed needle bearing 86 whose radially elongated needles are angularly offset about the common axis of rotation of the torque converter 30 and the brake 32. The clutch 74 also has a forwardly facing annular sealing plate 88. The vanes 90 of the stator 72 are mounted on the outer clutch ring 80 and carry another segment 92 of the aforementioned core.

The output shaft 94 of the torque converter 30 is coaxially mounted in the sleeve 38 by means of a ball bearing 96 whose outer ring 97 is axially secured between respective radial faces 98, 100 of the bracket 36 and of the sleeve 38, and whose inner ring 102 is mounted on the shaft 94 between a shoulder 104 and a snap ring 106. The front end of the shaft 94 carries a sleeve 108 journaled in the sleeve 38 by means of a bearing bushing 110 in approximate radial alignment with the vanes 90 of the stator 72.

Splines 112 on the sleeve 108 engage mating grooves in the hub 114 of the converter turbine 116, the turbine being riveted to the hub. The axial position of the turbine is secured by abutting engagement of the hub 114 with the aforementioned sealing plate 88 of the one-way brake 74 and with a washer 118 axially interposed between the hub 114 and the converter housing 52. The vanes 120 of the turbine 116 carry yet another segment 122 of the toroidal core.

The vanes 68, 90, 120 jointly form a doughnut-shaped vane arrangement 124 which differs from the toroidal shape of conventional vane arrangements by being oval in the sectional view of the drawing, the minor axis of the oval being almost precisely parallel to the axis of rotation of the shaft 94, and the major axis of the oval being practically perpendicular to that axis.

The converter space 126 which is enclosed mainly by the impeller 40 and the attached housing 52 is normally completely filled with hydraulic fluid which is circulated by means of a non-illustrated pump to keep the fluid cool. The oil is fed from the pump through a supply line 128 to a bore 130 in the front portion 12 of the outer casing 10, is then led by a generally radial pipe 132 to an oblique bore 134 in the bracket 36 which communicates with a similar bore 136 in the sleeve 38. The annular space between the latter and the shaft 94 is divided into two coaxial conduits 150, 152 by a sheet metal tube 140, the bore 136 being open toward the outer conduit 152. The fluid further flows through a radial bore 142 of the sleeve 38 and between the needles of the bearing 86 into the converter space 126.

Within that space, the fluid follows a path generally indicated by arrows A, and is released through radial grooves 144 on the washer 118, an axial bore 146 and a radial bore 148 in the partly hollow shaft 94, the aforementioned conduit 150, bores 154, 156 in the partition wall 34, and additional conduits, not shown in the drawing, which terminate outside the casing 10. The interaction between the converter vanes 68, 90, 120 and the fluid in the space 126 is too well known to require more detailed description.

Figure 2:
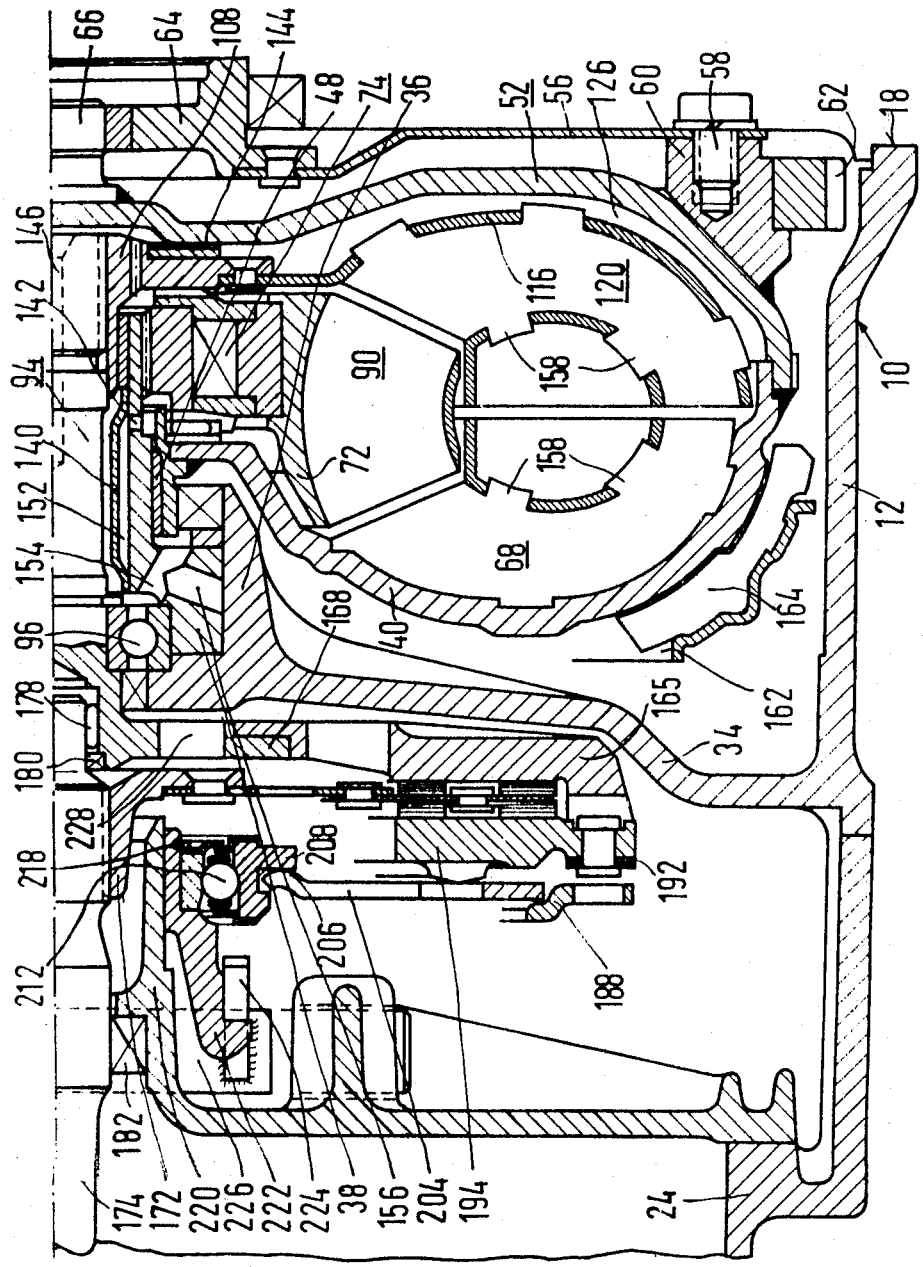
FIG. 2 shows the lower half of the same apparatus in a similar view.

The vanes are fastened to supporting elements and to the several segments of the aforementioned core by lugs 158 on the vanes which engage mating recesses, as is best seen in FIG. 2. The impeller 40 carries an external sheet metal shroud 160 which is a rearwardly tapering short tube attached to the impeller by spot welds. The welds and partitions 164 divide the otherwise annular space 162 between the shroud 160 and the outer surface of the impeller 40 into ducts obliquely inclined relative to the torque converter axis which cause cooling air to flow radially outward in the torque converter compartment 26 when the impeller 40 is rotated. The air is drawn from the clutch compartment 28 into the converter compartment 26 through openings 228 in a driving disc 165 of the clutch 32 and through corresponding openings in the portion of the partition wall 34 not seen in the drawing.

The terminal rear portion of the shaft 94 passes through the bracket 36 and the partition wall 34 and forms the input shaft for a friction clutch 32 of the type described in more detail in the copending, commonly owned application of Richard Binder and Kurt Fädler for a "Clutch Assembly for an Automotive Vehicle," filed on Mar. 4, 1968, Ser. No. 710,409.

The clutch 32 has a driving disc 165 which is fastened to a flange 168 on the shaft 94 by rivets 166 and is closely adjacent the face of the partition wall 34 in the clutch compartment 28, as is best seen in FIG. 2. The disc 165 axially abuts against a clutch disc 170 in the illustrated engaged position of the clutch, the clutch disc 170 being mounted on the clutch output shaft 174 by means of a hub 172 and splines 176. The front end of the shaft 174 is journaled in the flange 168 by means of a needle bearing 178, and the shaft is further supported in non-illustrated bearings in the transmission housing 24. Packings 180, 182 are interposed between the shaft 174 and the flange 168 and the housing 24 respectively. Friction facings 184, 186 are provided on the clutch disc 170 in the usual manner.

An annular clutch cover 188 is fixedly attached to the driving disc 165 by means of bolts 190, and the cover 188 is linked to an annular pressure plate 194 by means of leaf springs 192 tangentially elongated relative to a common circle about the clutch axis, thus permitting the pressure plate 194 to move axially, but not circumferentially.

A diaphragm spring 196 has an outer rim 198 which abuttingly engages the cover 188, a radially intermediate annular portion 200 which axially abuts against an annular rib 202 on the pressure plate 194 and biases the plate toward the driving disc 165, and a radially inner rim portion which is divided by a multiplicity of radal slots into fingers 204 whose free ends 206 engage the outer ring 208 of a clutch release bearing 210. Balls 212 are interposed between the ring 208 and the inner ring 214 of the bearing 210. The ring 214 is axially secured on a sleeve 216 by a snap ring 218 while the sleeve 216 is axially guided on a tubular projection 220 of the transmission housing 24 coaxial with the shaft 174.

The clutch release bearing 210 is operated by means of hooks 222 on the sleeve 216 which cooperate with hooks 224 on a shaft 226. The shaft 226 pivots on the transmission housing 24 in a plane which is radial relative to the clutch output shaft 174 and is offset from the shaft 174. When the shaft 226 is pivoted by a non-illustrated linkage connecting the shaft to a clutch pedal, the fingers 204 are pulled rearwardly, thereby releasing the intermediate portion 200 of the diaphragm spring from the rib 202, and relaxing the spring pressure on the friction facings 184, 186. The clutch first slips, and may then be fully disengaged.

The afore-described portion of a power train is short in the direction of the common axis of the torque converter 30 and of the clutch 32 because of the oval, sectional configuration of the vane arrangement 124, and by the partial location of the sleeve 38 in the axial recess formed by the deeply dished central portion 44 of the impeller 40. The front bearing of the converter shaft 94 can thus be located in the bearing bushing 110 in radial alignment with the vane arrangement 124. Even the bracket 36 and associated elements are partly received in the space within the impeller 40 and thus axially coextensive with a portion of the vane arrangement 124. The brake 74 is entirely confined in a space axially coextensive with the minor axis of the vane arrangement 124, as viewed in section in the drawing.

The features which reduce the axial length of the clutch 32 have been discussed in more detail in the aforementioned copending application. An important feature of the clutch is the arrangement of the release bearing 210 substantially in the plane of the diaphragm spring 196.

It should be understood, of course, that the foregoing disclosure relates only to a preferred embodiment of the invention, and that changes and modifications may be made in the example of the invention herein chosen for the purpose of the disclosure which do not constitute departures from the spirit and scope of the invention.

What is claimed is:

1. In a power train including an outer casing, a partition wall dividing the interior of said casing into two compartments and having respective faces in said compartments, a torque converter and a clutch mounted in said compartments respectively for movement about a common axis of rotation, the torque converter including an impeller, a stator, and a turbine carrying respective vanes, the vanes jointly constituting a substantially doughnut-shaped vane arrangement centered on said common axis, and the clutch having a driving member and a driven member, the improvement which comprises:
   (a) bearing bracket means extending from said partition wall toward said torque converter, said bracket means including
      (1) a bracket member fixedly fastened to said partition wall, and
      (2) a sleeve member extending from said bracket member in the direction of said common axis, a portion of said sleeve member being axially coextensive with a portion of said vane arrangement, said bracket member and said sleeve member having respective axially spaced opposite faces;
   (b) a first bearing axially interposed between said faces; and
   (c) a second bearing on said portion of said sleeve member, said second bearing being axially spaced from said first bearing away from said partition wall,
      (1) said torque converter including an output shaft secured to said turbine and to said driving member for rotation and journaled in said first and second bearings for rotation about said common axis,
      (2) said vane arrangement being of oval shape in section through said common axis,
      (3) the oval defined by said vane arrangement in said section having a minor axis substantially parallel to said common axis and a major axis transverse to said common axis.

2. In a power train as set forth in claim 1, a one-way brake mounted on said bracket means and carrying said stator, said brake being confined in a space coextensive with said minor axis.

3. In a power train as set forth in claim 1, said impeller having a hub portion adjacent said axis and radially aligned with said vane arrangement.

4. In a power train as set forth in claim 3, a one-way brake mounted on said bracket means and carrying said stator, and an antifriction bearing axially interposed between said hub portion and said one-way brake.

5. In a power train as set forth in claim 1, said outer case having two portions offset in the direction of said common axis and respectively enveloping said torque converter and said clutch, said partition wall being integral with the portion of said casing enveloping said torque converter.

6. In a power train as set forth in claim 1, said impeller being mounted on said sleeve member, yet another bearing being interposed between said sleeve member and said impeller.

7. In a power train as set forth in claim 6, said faces of said partition wall being closely adjacent said impeller and said driving member respectively.

8. In a power train as set forth in claim 1, said impeller and said stator being mounted on said sleeve member.

References Cited
UNITED STATES PATENTS

| | | | |
|---|---|---|---|
| 2,792,716 | 5/1957 | Christenson | 60—54 X |
| 2,935,169 | 5/1960 | Mills | 192—3.33 X |
| 2,950,630 | 9/1960 | Zeidler | 192—3.33 X |
| 3,006,217 | 10/1961 | Dodge | 60—54 X |
| 3,109,524 | 11/1963 | Howard | 192—3.33 |
| 3,312,061 | 4/1967 | Murphy | 60—54 |
| 3,326,065 | 6/1967 | Murphy | 192—3.33 X |

BENJAMIN W. WYCHE III, Primary Examiner

U.S. Cl. X.R.

192—110